United States Patent
Tickett

[15] 3,703,906
[45] Nov. 28, 1972

[54] PIPE FITTING
[72] Inventor: Edward F. Tickett, El Paso, Tex.
[73] Assignee: Alex B. Reynolds, St. Louis, Mo. ; a part interest
[22] Filed: March 5, 1971
[21] Appl. No.: 121,299

Related U.S. Application Data

[63] Continuation-in-part of Ser. No. 864,739, Oct. 8, 1965, abandoned, and a continuation-in-part of Ser. No. 54,398, Aug. 13, 1970, Pat. No. 3,652,107.

[52] U.S. Cl...................................137/15, 137/318
[51] Int. Cl. .........................F16e 41/04, B23b 41/08
[58] Field of Search ..137/15, 315, 317, 318; 29/213; 166/.5, .6, 55; 138/89, 92, 97

[56] References Cited

UNITED STATES PATENTS

| | | | |
|---|---|---|---|
| 1,989,768 | 2/1935 | Nieman | 137/318 X |
| 3,032,867 | 5/1962 | Kerr | 29/213 |
| 3,108,499 | 10/1963 | Duncan | 137/318 X |
| 3,227,011 | 1/1966 | Larry | 137/318 X |
| 3,385,314 | 5/1968 | Thompson | 137/318 |

Primary Examiner—Martin P. Schwadron
Assistant Examiner—David R. Matthews
Attorney—Cohn and Powell

[57] ABSTRACT

The pipe fitting is formed from a pair of coupling halves which are fastened together about a continuous pipe. One of the coupling halves includes a built-in cutter assembly capable of severing the pipeline into sections which are subsequently coupled together by the coupling halves. The other coupling half includes a valve compartment which receives a valve element inserted between the separated pipe sections. The valve may be adjusted to permit flow between the pipe sections; to divert flow to a branch line; and to cut off flow through the valve entirely. The pipe fitting is insulated from the pipe sections by liners and includes a fluid seal to preclude the escape of fluid from the pipeline following separation of the pipe into sections.

22 Claims, 16 Drawing Figures

Inventor
EDWARD F. TICKETT

By Cohn and Powell
Attorneys

Inventor
EDWARD F. TICKETT

By Cohn and Powell
Attorneys

Inventor
EDWARD F. TICKETT
By Cohn and Powell
Attorneys

Inventor
EDWARD F. TICKETT
By Cohn and Powell
Attorneys

FIG. 16

PIPE FITTING

CROSS REFERENCE TO RELATED APPLICATIONS

This is a continuation-in-part of copending applications, Ser. No. 864,739, filed Oct. 8, 1969 and now abandoned, and Ser. No. 54,398, filed July 13, 1970, now U.S. Pat. No. 3,652,107.

BACKGROUND OF THE INVENTION

This invention relates in general to a pipe fitting for severing a pipeline into sections and thereafter coupling the severed sections together and in particular to a fitting which provides a valve control between the pipe sections without interrupting flow through the pipeline.

It is frequently desirable to insert a valve into an existing pipeline in order to tap-off, divert or, in some way control flow through the pipeline. In the past, this has been accomplished either by discontinuing flow through the pipeline to enable a valve to be inserted, or alternatively, if it were important to maintain flow through the pipeline, by means of special devices. Known special devices capable of permitting the insertion of a valve into a pipeline while maintaining flow invariably include a stationary housing enclosing a rotating cutter operated by remote control. The valve in such devices is either built into the housing or inserted from the outside by using a compartmentalized housing capable of providing a temporary gas lock. Such devices are not only cumbersome and complicated to operate but are also expensive.

It is desirable to provide cathodic protection against corrosion for sections of metal pipelines, particularly those which are buried below ground or submerged. Such protection is facilitated by electrically isolating sections of the pipeline from each other and protecting each section independently. Pipe sections which are separated from each other for the purpose of inserting a valve provide a convenient location for insulating pipe sections from each other but such insulation is not known in existing severing and coupling devices.

The removal and replacement of gas meters from apartments and the like, which is known as "routining" in the gas utility industry, presents a problem because in the past it has been necessary to cut off the supply to the consumers during the operation. In the interests of safety, each apartment must be checked to ensure that no gas taps remain open when the supply is resumed. Obviously, with large apartment dwellings, these factors present great inconvenience to consumers and gas companies alike and it is highly desirable to provide an uninterrupted flow during such operations.

SUMMARY OF THE INVENTION

This pipe fitting provides a means of inserting a valve into an existing pipeline without discontinuing flow through the pipeline. The fitting provides a coupling housing a pipe cutter which is operated directly rather than by remote control because the coupling itself is rotatable to orbit the cutter about the pipe.

The coupling is effectively sealed by the same seals during the severing and separating operation and following coupling of the separated sections. The pipe sections are insulated from each other to facilitate independent, cathodic protection of each section. The valve is adjustable to control flow between the separated sections and to divert flow to a branch line and hence provides a means of "routining" gas meters.

The pipe fitting includes a coupling providing a pair of coupling portions adapted to be disposed about a pipe containing fluid under pressure and the coupling includes an outlet port. The coupling portions are connected together by fasteners which permit the coupling to be rotated about the pipe during the severing operation. The same fasteners provide a means of clamping the coupling portions firmly together about the pipe following the severing operation.

Cutter means is carried by the coupling within a cutter compartment and valve means is carried by the coupling within a valve compartment. The valve compartment communicates between the severed pipe sections to permit flow control by the valve means. The valve means includes passage means communicating between the pipe sections in a first valve position; and between one of said pipe sections and the outlet port in a second valve position. The valve means is adjustable to a third valve position to effectuate complete cut-off of flow through the valve.

The first embodiment of the valve means provides a push-pull operating element and the second embodiment provides a rotating operating element. In the first embodiment, the valve means includes a body providing an outer case, mounted in non-rotatable relation within a rectangular valve compartment, and an inner piston, slidably received by the outer case. The outer case includes opposed ports communicating with associated pipe sections and a transverse port communicating with the coupling outlet port. The piston includes a first port communicating between said opposed ports in the first valve position and a second port communicating between one of said opposed ports and the transverse port in the second valve position. Spaced stop means between the outer case and the slidable piston define the valve positions.

In the second embodiment, the valve means includes a rotatable, cylindrical body threadedly mounted within a circular valve compartment and including an inner portion providing T-shaped passage means selectively communicating between the pipe sections and the outlet port in the first and second valve positions. The valve body includes an indicator at the outer end to indicate direction of flow through the passage means.

In both embodiments, each coupling portion carries insulation means adapted to insulate the pipe from the coupling, and sealing means adapted to seal the gap between the pipe sections following the severing operation. The valve body in each embodiment includes an insulating portion separating the ends of the pipe sections from each other.

The pipe fittings provide a method of removing and replacing a meter or the like from a pipeline. The method includes mounting one of the fittings on each side of the meter; connecting a bypass line between the outlet, or "routine" ports of the fittings; and simultaneously cutting off flow through the meter and diverting flow to the bypass line.

DESCRIPTION OF THE PREFERRED EMBODIMENT:

Referring now by characters of reference to the drawings and first to FIGS. 1 through 9 representing the first embodiment, it will be understood that the pipe fitting for severing and coupling a fluid pipeline includes a coupling 10 formed from upper and lower coupling halves 11 and 12 constituting coupling portions. The coupling 10 is rotatively mounted to a pipe 13 conveying natural gas or other fluid under pressure, and is used for the purpose of separating the pipe 13 into upstream and downstream sections 14 and 15 and thereafter coupling the severed sections together while maintaining flow. The coupling halves 11 and 12 are connected together for rotation about the pipe 13 in a first mounted condition during which L-shaped fasteners 16 connecting the halves together through the keyhole-shaped holes 17 are only partially tightened. The upper coupling half 11 is adapted to carry a cutter assembly, generally indicated by numeral 18, and FIG. 1 indicates the disposition of parts of the cutter assembly before the pipe 13 is severed. The lower coupling half is adapted to carry a valve assembly, generally indicated by numeral 19 in FIGS. 3, 4 and 5. The valve assembly 19 is omitted for clarity in FIGS. 1 and 2.

When the pipe 13 has been severed, the pipe sections 14 and 15 are drawn apart and held apart by the valve assembly 19 which is insulated to ensure that the ends of the severed pipe sections are not in electrically conductive contact with each other. The fasteners 16 are then fully tightened to clamp the coupling 10 firmly in place in a second mounted condition.

The pipe sections 14 and 15 are insulated from the coupling 10 by means of a pair of similar liner, generally indicated by numerals 20 and 21, carried by associated coupling halves 11 and 12 respectively. A pair of continuous resilient seals, indicated by numeral 22, (see FIG. 9) preclude fluid escape during the first and second mounted conditions.

Figure 1:
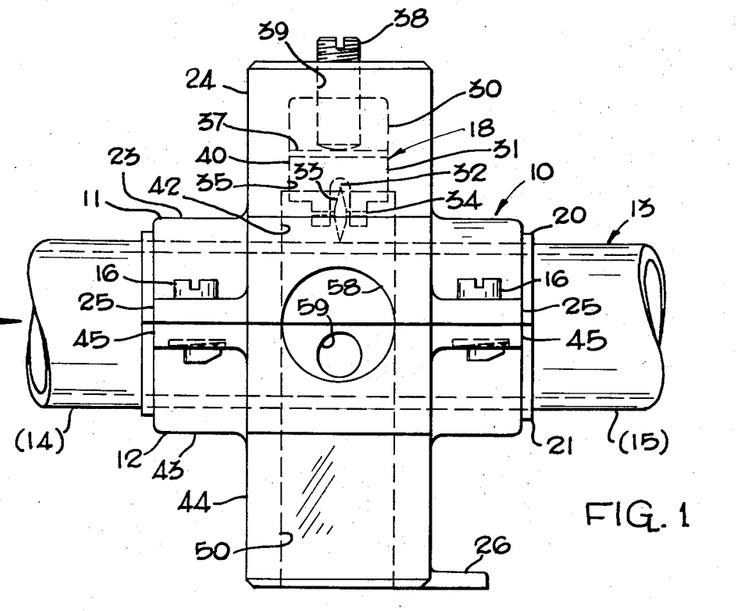
FIG. 1 is an elevational view of the pipe fitting mounted to the pipeline prior to the severing operation and before installation of the valve assembly.

Referring more specifically to the details of the embodiment represented by FIGS. 1 through 9, it will be seen from FIG. 1 that the upper coupling half 11 includes a substantially semicircular body 23 having an enlarged, integrally formed semi-octagonal mid-portion 24. The body 23 is flanked by opposed flanges 25 which provide the keyhole-shaped holes 17. The mid-portion 24 of the coupling half 11 is hollow to provide a cutter compartment 30 for housing the cutter assembly 18. The cutter assembly 18 includes a cutter block 31 having a recess 32 serving to mount a cutter wheel 33 to the cutter block 31 by means of a pin 34. The cutter compartment 30 is partially defined by opposed flat faces 35 and opposed flat faces 36 which are slidingly engaged respectively by the sides 40 and the ends 41 of the cutter block 31. The cutter compartment is generally rectangular in configuration to preclude rotation of the compatibly configurated cutter block 31 therein. The cutter block 31 which is preferably of an electrically non-conductive material is provided with a metal backing plate 37 and during the cutting process, the cutter block 31 is advanced by means of a pressure screw 38 received within a threaded hole 39 and bearing directly on the backing plate 37. The cutter compartment 30 is enlarged at its lower end to provide a rectangular compartment 42 receiving the end of the valve assembly 19 which will be described in detail later.

The lower coupling half 12 is similarly constructed to the upper coupling half 11 and includes a substantially semicircular body 43 having an enlarged, integrally formed, semi-octagonal mid-portion 44. The body 43 is flanked by opposed flanges 45 which include keyhole-shaped holes 17 registerable with matching holes 17 of the upper coupling half 11. The holes 17 in the lower flange are countersunk to provide an inclined face 47 having a plurality of protuberances 48 which are engaged by the foot of the L-shaped fasteners 16 and hold the fastener in place as it is tightened by rotation.

Figures 3, 4:
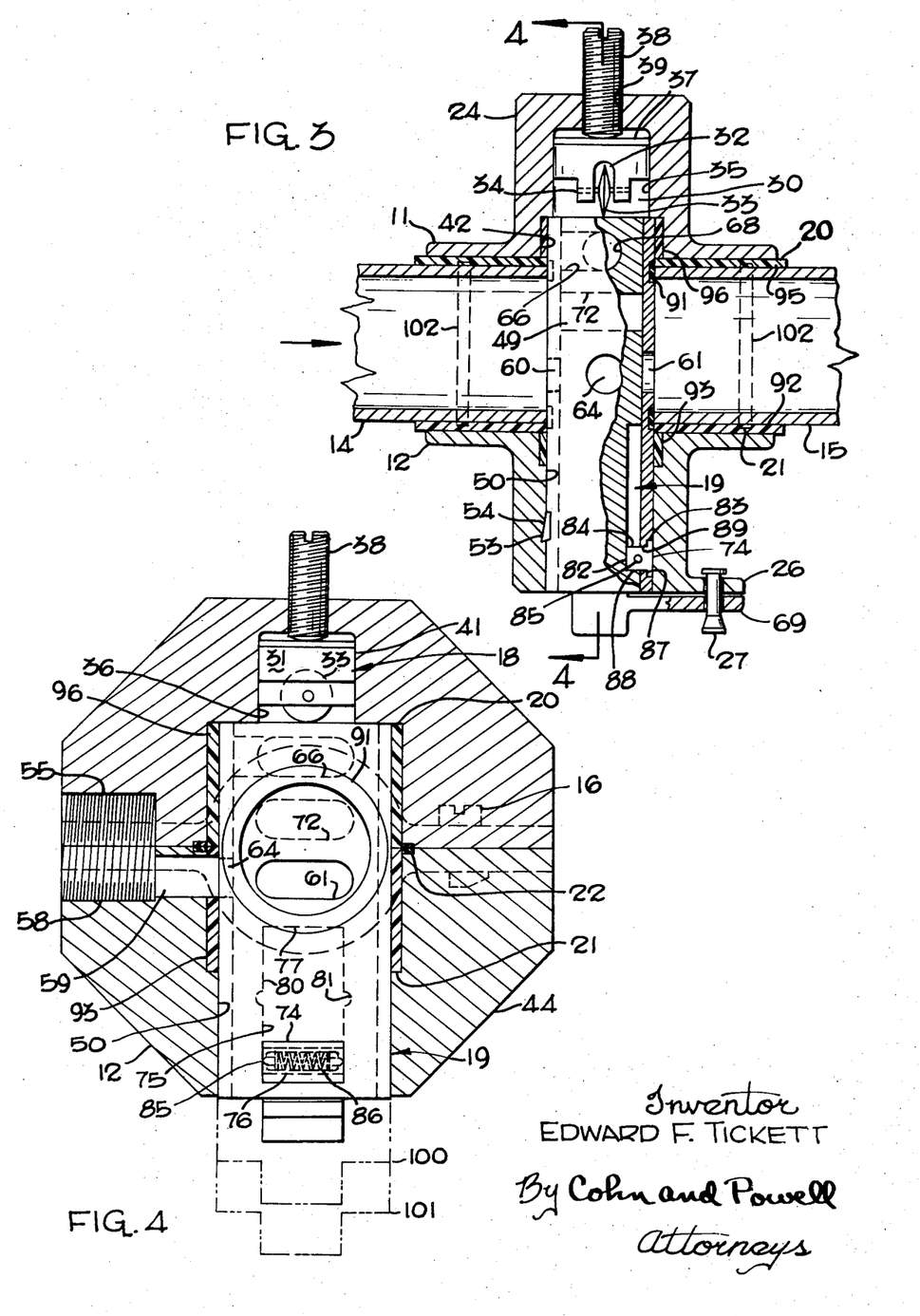
FIG. 3 is a sectional, elevational view of said fitting following separation of the pipe sections and installation of the valve assembly.
FIG. 4 is a cross sectional view taken on line 4—4 of FIG. 3.

The mid-portion 44 of the coupling half 12 is hollow to provide an elongate, rectangular valve compartment 50 which communicates with a gap 49 provided when the pipe sections 14 and 15 are separated. The disposition of parts following the separation of the pipe into sections is shown in FIGS. 3 and 4. The upper and lower coupling halves 11 and 12 each include a substantially semicircularly formed recess, which provides an outlet port 55, to divert flow from the pipe 13 through the valve assembly 19. The outlet port 55 is fitted with a removable plug 56 which is replaceable by a branch pipe fitting 57.

Figures 5, 6, 7, 8, 9:
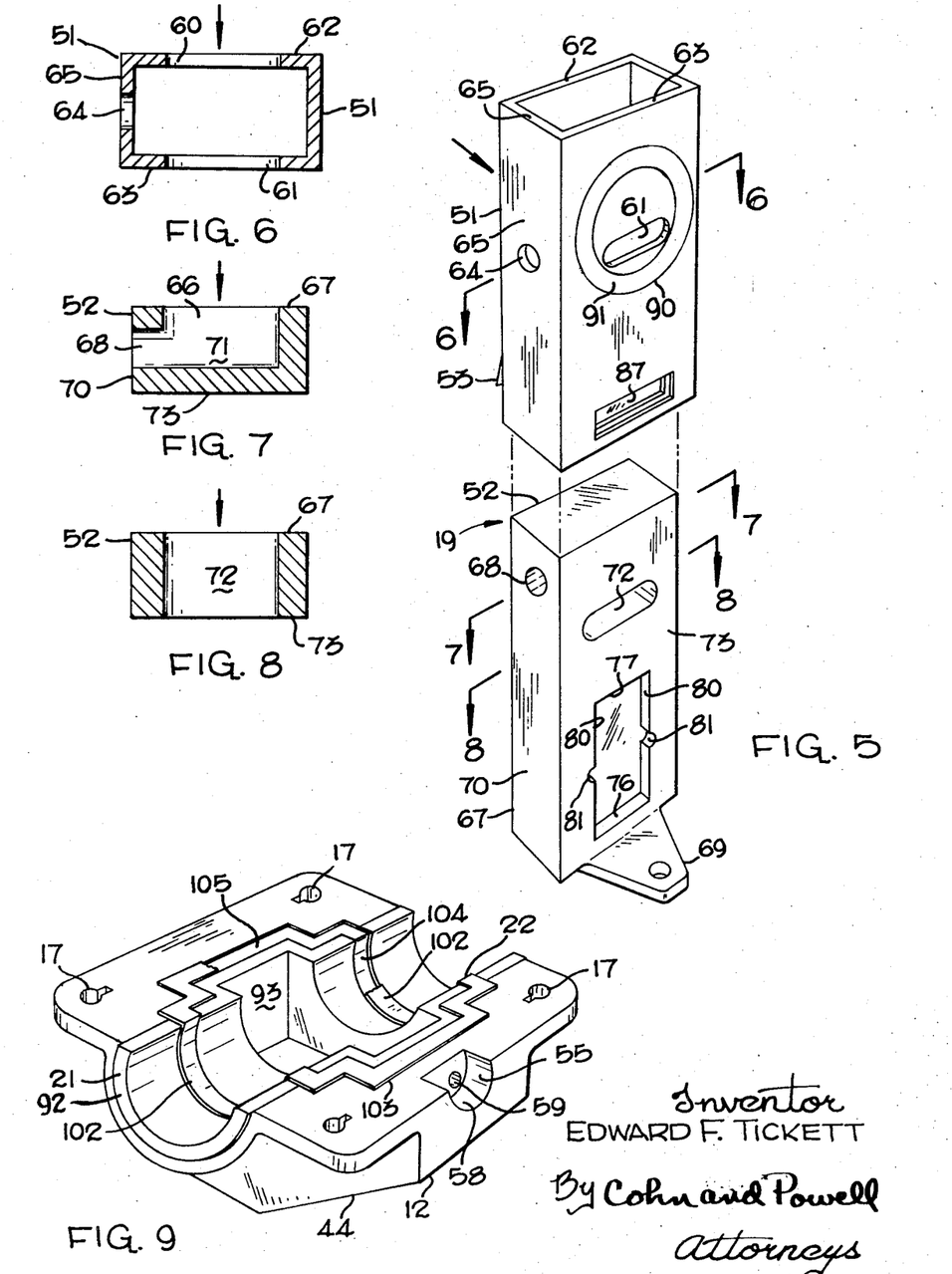
FIG. 5 is an exploded view in perspective of the push-pull valve assembly of said fitting.
FIGS. 6, 7 and 8 are sectional views of the valve assembly taken respectively on lines 6—6, 7—7 and 8—8 of FIG. 5.
FIG. 9 is a perspective view of the lower coupling illustrating the liner and continuous seal for said fitting.

The valve assembly 19 is shown in exploded perspective in FIG. 5 and includes an outer rectangular case 51 and an inner piston 52 slidably movable within said case 51. The outer case 51 is inserted within and received by the valve compartments 50 and 42 in the lower and upper coupling halves 11 and 12 respectively. The case 51 is locked in place by means of a pair of recessed spring elements 53 which are provided on said case 51 and which cooperate with compatible recesses 54 provided in the valve compartment 50 as shown in FIG. 3.

When the valve assembly 19 is installed, it may be adjusted to any one of three valve settings by the selective alignment of ports provided in the outer case 51, the piston 52 and the coupling 10. These ports are so arranged that the following valve settings are possible. The first setting is when the piston 52 is fully inserted within the case 51 with the result that fluid flow between the upstream and downstream pipe sections 13 and 14 is completely cut off. The second setting is when the piston 52 is partially withdrawn from the case 51 resulting in fluid flow directly through the valve. The third setting is when the piston 52 is withdrawn from the case 51 to its fullest extent with the result that flow from the upstream pipe section 14 is diverted to the coupling outlet port 55, which communicates with the gap 49 between the ends of the pipe sections 14 and 15.

The valve ports are clearly shown in FIGS. 5–8. To provide the various settings, the outer case 51 includes oblong ports 60 and 61 in the upstream and downstream walls 62 and 63 respectively. A circular port 64 is provided in an adjacent side wall 65.

The piston 52 includes an upper oblong port 66 in the upstream face 67 and a circular port 68 formed in the side face 70, said ports 66 and 68 together forming an L-shaped passage 71. The piston 52 also includes a lower oblong port 72 which communicates directly between the upstream and downstream faces 67 and 73. When the piston 52 is fully inserted within the case 51, as shown in FIG. 3, the disposition of parts of the valve assembly 19 is such as to provide complete cut-off of the valve because the case ports 60 and 61 are not in register with either of the piston ports 66 or 72. In this position, the piston faces 67 and 73 provide closure means blocking flow through case ports 60 and 61. To permit flow between upstream and downstream pipe sections 14 and 15, the piston 52 must be withdrawn until the piston lower port 72 is in register with the case ports 60 and 61. To divert flow from the upstream pipe section 14 through the outlet port 55, the piston 52 must be withdrawn to its fullest extent until the upper port 66 is in register with the case port 60. In this setting, the piston side port 68 is in register with the case side port 64 and also with a reduced diameter portion 59 of the outlet port 55.

The three settings described above are controlled by a latch assembly, generally by numeral 74 in FIGS. 3 and 4 and detailed to some extent in FIG. 5. The latch assembly 74 includes a substantially rectangular recess 75 provided in the downstream face 73 of the piston 52 and said recess 75 is defined in part by end abutment faces 76 and 77 and side faces 80. Opposed notches 81 are provided disposed at the mid-point of the side faces 80. As shown in FIGS. 3, 4 and 5, the case 51 includes an inwardly projecting T-shaped latch element 82 inset into a recess 87 provided in the downstream wall 63. The latch element 82 includes a head 83 and a stem 84 which projects into the piston recess 75. The stem 84 provides a housing for a pair of opposed, ball-ended catch elements 85 which are spring-loaded by means of a spring 86. The latch stem 84 includes opposed shoulders 88 and 89 which are engageable with the piston recess abutments 76 and 77 respectively. Engagement of the abutment 76 by the shoulder 88 defines the inward limit of the piston 52 relative to the case 51. When the piston 52 is withdrawn halfway, to the valve open position, the notches 81 are adjacently disposed of and receive the catch elements 85 to define said valve open position. Engagement of the recess abutment 77 by the shoulder 89 when the piston 52 is fully withdrawn relative to the case 51, defines the position in which flow is diverted to the outlet port 55. It will be understood that the rating of the spring 86 is sufficiently light to permit the catch elements 85 to be disengaged from the notches 81 by hand pressure.

Figure 2:
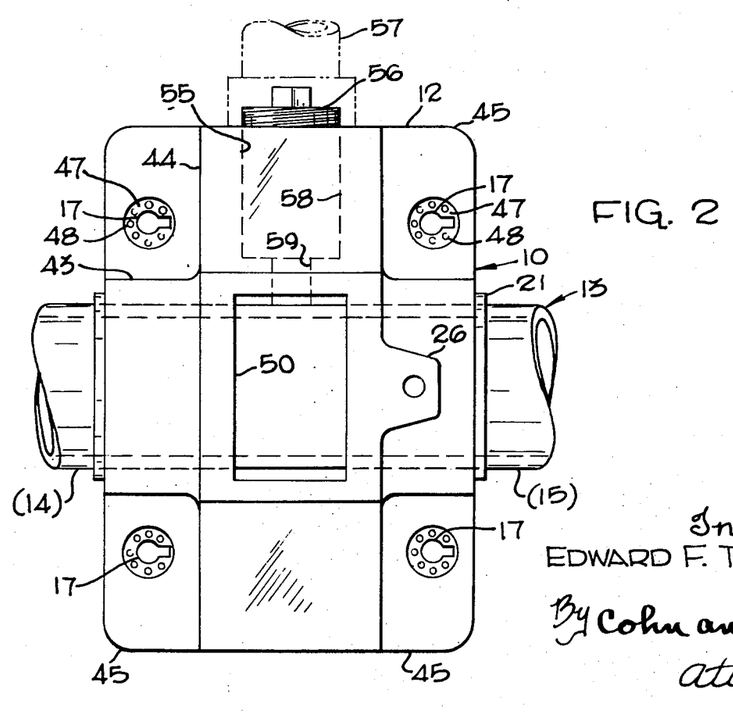
FIG. 2 is a view on the underside of said fitting.

As indicated in FIGS. 2 and 4, the outlet port 55 includes an enlarged portion 58 and a reduced portion 59. The enlarged portion 58 threadedly receives a removable plug 56 which is replaceable by a branch line fitting 57 indicated in dotted outline. The outlet port enlarged portion 58 is formed from a pair of semicircular recesses provided in associated coupling halves 14 and 15 respectively. The reduced portion 59 is formed in the lower coupling half 12.

In order to insulate the valve assembly 19 from the ends of the separated pipe sections 14 and 15, the valve case 51 is recessed on the upstream and downstream walls to provide annular grooves 90 accommodating substantially flush insulating gaskets 91, each of which serves to seat the end of an associated pipe section. This arrangement ensures that the pipe sections 14 and 15 are electrically insulated from the valve assembly 19 and thereby from each other.

As stated above, the coupling halves 11 and 12 are provided with inner liners 20 and 21 formed of an electrically non-conductive material and as shown in FIG. 9, the lower liner 21 includes an arcuate portion 92 compatibly formed with the lower coupling 12 to receive the pipe 13. Liner 21 also includes a rectangular valve-receiving portion 93 which defines the valve compartment 50, and is apertured to define part of the reduced portion 59 of the outlet port 55, see FIG. 4. As shown in FIGS. 3 and 4, the upper liner 20 is substantially similar to the lower liner 21 and includes an arcuate portion 95 and a valve receiving portion 96 defining the upper valve compartment 42.

The fluid seals 22, which preclude the escape of fluid from the coupling 10, are shown in detail in FIG. 9. It will be understood that the seals in the upper and lower coupling halves are similar and that the lower seal 22 includes a pair of arcuate portions 102, interconnected by substantially longitudinal portions 103. The arcuate portions 102 are accommodated with compatible arcuate grooves 104 formed within the liner 21 and the longitudinal portions 103 are accommodated within compatible longitudinal grooves 105, formed in the adjacent metal body. The seals 22 are of such a thickness as to project from the accommodating grooves to that when the coupling 10 is mounted to the unsevered pipe 13, the seals provide, in effect, a journal bearing facilitating rotation of said coupling 10. When the fasteners 16 are tightened after severing the pipe 13, the arcuate portions 102 are depressed by engagement with the pipe sections 14 and 15 into their associated grooves 104. The longitudinal portions 103, on the other hand, exert sealing pressure against each other. In this way, continuous and complete fluid sealing is achieved.

The piston 52 and the lower coupling half 12 include adjacent lugs 69 and 26 respectively, which are connectible by a fastener 27 to prevent unauthorized tampering.

Figure 10:
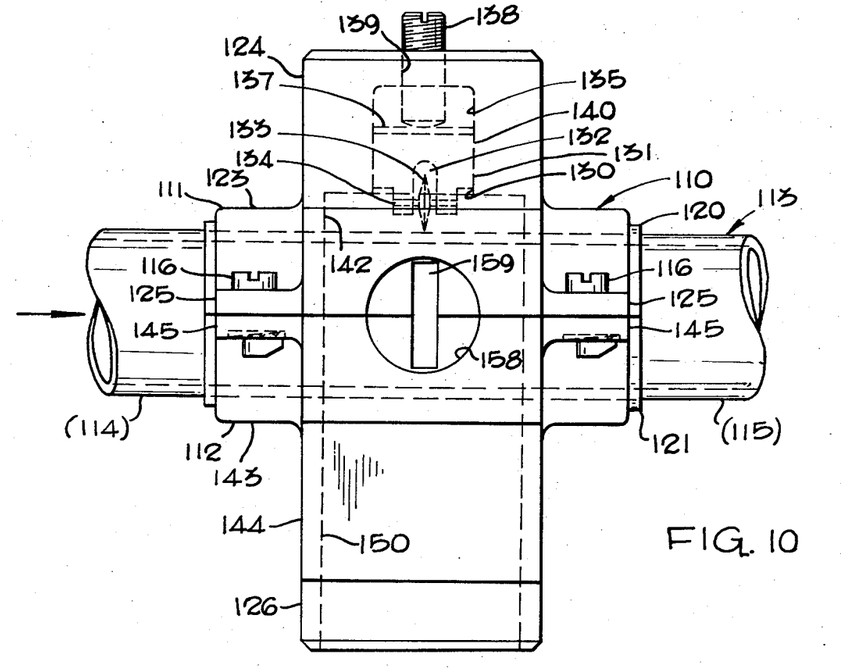
FIG. 10 is an elevational view of a modified pipe fitting or second embodiment mounted to the pipeline prior to the severing operating and before installation of the valve assembly.
Figure 11:
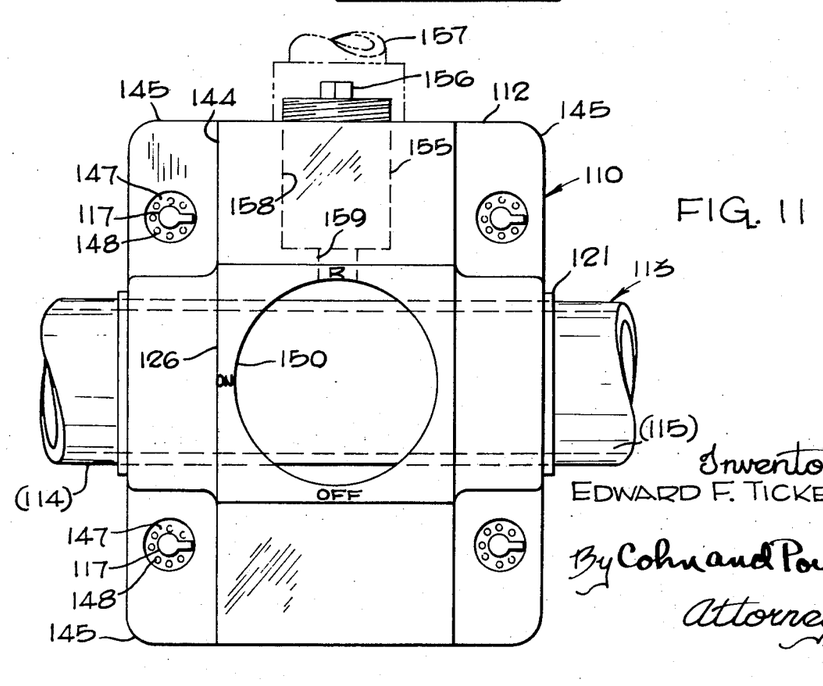
FIG. 11 is a view taken on the underside of the modified pipe fitting.
Figures 12, 13, 14, 15:
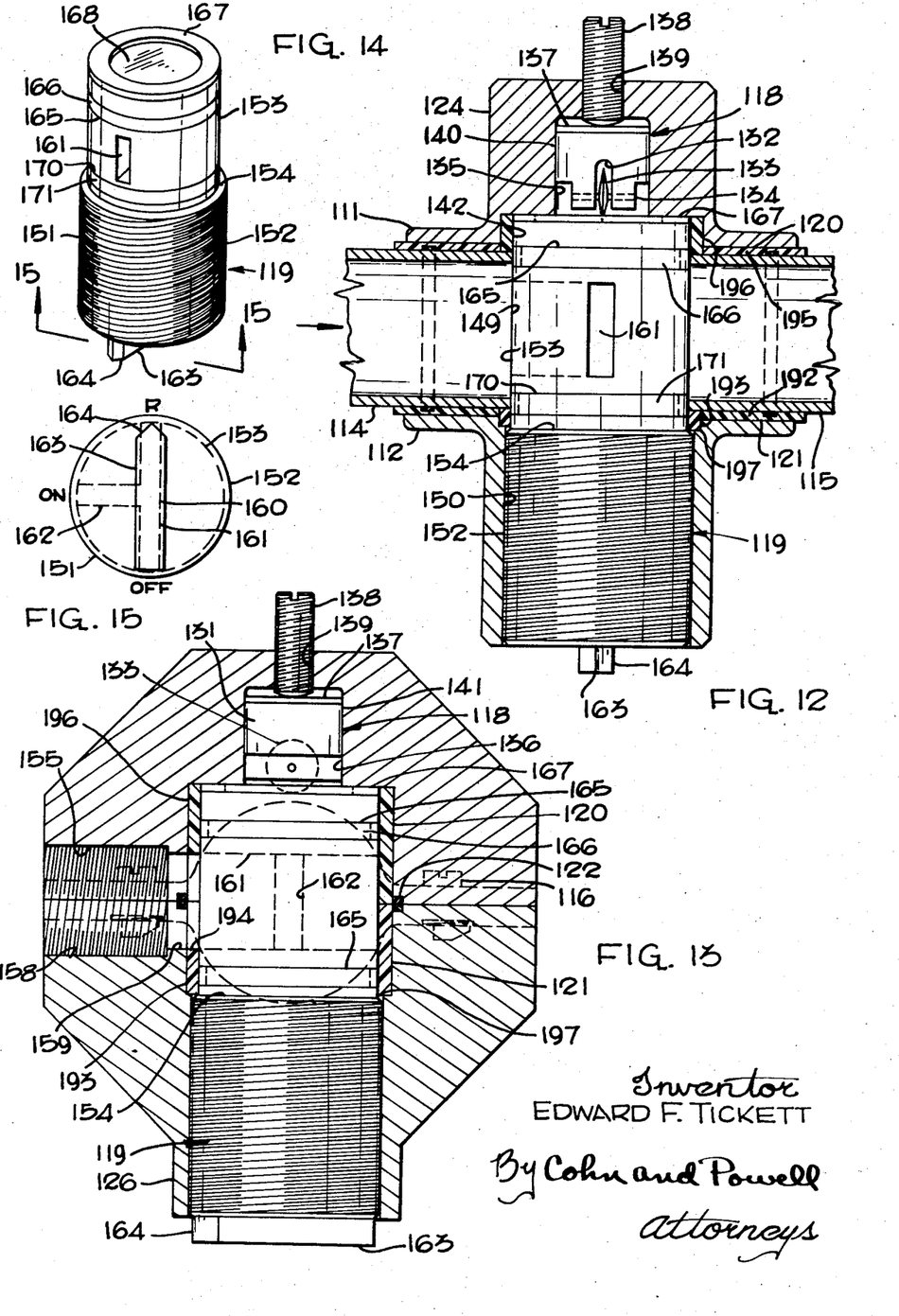
FIG. 12 is a sectional view through the modified pipe fitting following separation of the pipe sections and installation of the valve assembly.
FIG. 13 is a cross sectional view taken on line 13—13 of FIG. 12.
FIG. 14 is a perspective view of the rotary valve assembly of the modified pipe fitting.
FIG. 15 is a view taken on line 15—15 of FIG. 14.

Referring now to the modified pipe fitting or second embodiment represented by FIGS. 10 through 15, it will be seen that FIGS. 10 and 11 illustrate a coupling 110 formed from upper and lower coupling halves 111 and 112 as mounted to a pipe 113 prior to the severing and separating of said pipe 113 which conveys fluid such as natural gas under pressure. The coupling 110 is adapted to receive a rotating valve assembly, generally indicated by numeral 119. FIGS. 12 and 13 illustrate the disposition of parts following the severing of the pipe 113 into upstream and downstream sections 114 and 115. The severing and separating of the pipe 113 and the clamping of the coupling following separation are substantially as described for the first embodiment.

The upper coupling half 111 includes a substantially semicircular body 123 having an enlarged integrally formed semi-octagonal mid-portion 124. The body 123 is flanked by opposed flanges 125 which provide keyhole-shaped holes 117. The mid-portion 124 is hollow to provide a cutter compartment 130 housing a cutter assembly 118. The cutter assembly 118 includes a cutter block 131 having a recess 132 serving to mount a cutter wheel 133 by means of a pin 134. The cutter compartment 130 is partially defined by opposed flat faces 135 and opposed flat faces 136 which are slidingly engaged respectively by the sides 140 and the ends 141 of the cutter block 131. The cutter compartment 130 is generally rectangular in configuration to preclude rotation of the cutter block 131 therein. The cutter block 131 which is preferably formed from an electrically non-conductive material, includes a metal backing plate 137 and during the cutting process, the cutter block 131 is advanced by a pressure screw 138 received within a threaded hole 139 and bearing directly on the backing plate 137. The cutter compartment 130 is enlarged at its lower end to provide a cylindrical compartment 142 receiving the end of the valve assembly 119 to be described later.

The lower coupling half 112 is similar to the upper coupling half 111 in that it includes a substantially semicircular body 143 having an enlarged integrally formed semi-octagonal mid-portion 144. The body 143 is flanked by opposed flanges 145 which provide keyhole-shaped holes 117 registerable with matching holes 117 in the upper coupling half 111.

The mid-portion 144 of the coupling half 112 includes a depending extension 126 and is hollow to provide a threaded, cylindrical valve compartment 150 which communicates with the gap between separated pipe sections 114 and 115. The upper and lower coupling halves 111 and 112 each include a substantially semicircularly formed recess which provides an outlet port 155 to divert flow from the pipe 113 through the valve assembly 119. The outlet port 155 is fitted with a removable plug 156 which is replaceable by a branch line fitting 157.

The rotating valve assembly 119 is shown in perspective in FIG. 14 and includes a substantially cylindrical body 151 having an enlarged threaded outer portion 152 and a reduced barrel portion 153 which is provided with an annular resilient seal 167 on its end face 168. The barrel portion 153 includes a substantially T-shaped passage 160 having a head portion 161 and a stem portion 162. When the valve body 151 is installed within the compartments 142 and 150, it may be rotated to various valve settings by the selective orientation of the T-shaped passage 160. These settings include cut-off of flow between the upstream and downstream pipe sections 114 and 115; flow between the pipe sections 114 and 115; and diversion of flow from the upstream pipe section 114 through the outlet port 155. The outer end of the body 151 includes a valve handle 163 which has one end formed into an indicator arrow 164 to indicate the direction of gas flow as shown in FIG. 15. It will be understood from FIG. 15 that the indicator handle 163 is parallel with the passage head portion 161. When the handle 163 is disposed transversely of the longitudinal pipeline axis so that the arrow 164 points to the outlet port 155, indicated by R, flow to the downstream section 115 is cut off and diverted through the outlet port 155. The valve is shown in this position in FIGS. 12 and 13. When the handle 163 is rotated so that the arrow 164 points upstream to the ON designation, flow is between the upstream and downstream sections 114 and 115 only, and when the handle 163 is rotated so that the arrow 164 points to the OFF designation, the valve is completely closed. A further feature of this valve assembly 119 is that flow may be diverted to the outlet port 155 and maintained between the pipe sections 114 and 115 at the same time. This condition is achieved when the handle is rotated so that the arrow points downstream.

As indicated in FIGS. 10 and 13, the outlet port 155 includes an enlarged portion 158 threadedly receiving the plug 156 or the branch line fitting 157 and a reduced portion 159 having substantially the same configuration as the cross section of the T-shaped passage 160. It will be understood that when the valve assembly 119 is installed, the head portion 161 or the stem portion 162 of the passage 160 may be selectively placed in register with the reduced portion 159.

As shown in FIG. 12, when the pipe sections 114 and 115 are separated and the valve assembly 119 installed, the ends of the pipe sections abut the valve body 151. For this reason, the barrel portion 153 is recessed peripherally to provide grooves 165 accommodating spaced, annular, insulating gaskets 166 which serve to seat the severed pipe ends and ensure that the ends of the pipe sections 114 and 115 are electrically insulated from the valve body 151 and thereby from each other.

Each of the coupling portions 111 and 112 is provided with an inner liner, similar to those provided for the first embodiment and illustrated in FIG. 9, but adapted to suit a circular valve compartment. The liners are indicated by numerals 120 and 121 in FIGS. 10–13. The upper liner 120 includes an arcuate portion 195 and a cylindrical valve-receiving portion 196. The lower liner 121 includes an arcuate portion 192 and a valve receiving portion 193. The valve receiving portions 193 and 195 each include semi-oblong apertures 194 forming part of the reduced portion 159 of the outlet port 155. In order to preclude the escape of fluid from the coupling 110, each coupling half 111 and 112 is provided with a seal, generally indicated by numeral 122 in FIG. 13. These seals 122 are substantially similar to the seals provided for the first embodiment and are generally of the form indicated in FIG. 9 but adapted to suit a circular valve compartment.

It is thought that the structural features and functional advantages of these pipe fittings have become fully apparent from the foregoing description of parts, but for completeness of disclosure, the installation and operation of each embodiment will be briefly described.

In each of the pipe fittings described above, the installation of the coupling halves 11 and 12 and the subsequent severing and separating procedure is substantially the same. The procedure as applied to the embodiment of FIGS. 1-8 will therefore be used for the purpose of example.

It will be understood that the liners 20 and 21 associated with each coupling half 11 and 12 are carried by the associated coupling halves and are preferably molded directly to said associated coupling halves.

Before the upper and lower coupling halves 11 and 12 are mounted to the pipe 13, the pipe should be cleaned or otherwise prepared to provide a substantially smooth surface. The faces of the continuous seals 22 should be lightly lubricated. The arcuate seal portions 102, when placed together, provide a substantially O-ring configuration having an inside diameter substantially equal to the diameter of the pipe 13. When the upper and lower coupling halves 11 and 12 are connected together by means of fasteners 16, said fasteners 16 are tightened sufficiently so that the pipe 13 and coupling 10 are substantially fluid-sealed but the coupling 10 is capable of rotating about the pipe 13 utilizing the O-ring portions of the seals 22 as journal bearings in the first mounted condition.

Advancement of the cutter block 31 by the screw 38 causes cutting pressure to be applied to the cutter wheel 33 and by applying a wrench to the wrench lands provided by the semi-octagonal coupling mid-portions 24 and 44, the coupling 10 may be rotated about the pipe 13. This rotation orbits the cutter wheel 33 and by applying further pressure to the cutting wheel 33, the pipe 13 may be readily severed and separated into pipe sections 14 and 15. When separation is achieved, a gap 49 is created between the ends of the pipe sections 14 and 15. However, fluid which would otherwise leak from this gap 49 is prevented from doing so by the continuous seals 22. Before, or immediately following the severing of the pipe 13, the outlet plug 56 and the valve assembly 19 must be at least partly installed to facilitate sealing.

When the pipe 13 has been severed, the pipe sections 14 and 15 are drawn apart and valve assembly 19 fully installed by pushing the case 51 completely into the valve compartments 42 and 50 so that said case 51 is latched into place. The ends of the pipe sections 14 and 15 are then pushed into engagement with the insulation gaskets 91. When this has been accomplished, the fasteners 16 are fully tightened so that the coupling 10 is clamped to the pipe sections 14 and 15 in the second mounted condition and the valve assembly 19 may be operated as required.

Although the outlet port 55 is indicated as being formed in part in each coupling half 11 and 12, this outlet port 55 could be formed completely in one coupling half, as for example, through one of the 45° faces of the lower coupling mid-portion 24.

The operation of the valve assembly 19 is accomplished by adjusting the piston 52 within the case 51 to various settings. For example, when the piston 52 is fully inserted within the case 51, as shown in FIG. 4, the valve is in the closed position because the piston 52 effectively blocks fluid flow between the upstream and downstream case ports 60 and 61. In order to permit flow between the upstream and downstream pipe sections 14 and 15, the piston 52 is withdrawn until the piston port 72 is in register with the case ports 60 and 61. This is achieved when the piston 52 is in the position indicated by numeral 100 in FIG. 4 and the latch element 82 engages the recess notches 81. When the piston 52 is fully withdrawn to the position indicated by numeral 101 in FIG. 4 and the latch element 82 engages the recess abutment face 76, the elbow-shaped passage 71 is in register with the upstream port 60 of the case 51 and with the reduced portion 59 of the outlet port 55. In this position, flow is diverted from the upstream pipe section 14 to the outlet port 55.

The installation of the valve assembly 119 is similar to that described above except, of course, that the valve body 151 is threadedly received within the valve compartments 142 and 150.

The modified pipe fitting illustrated in FIGS. 10 through 15 provides a rotary rather than a push-pull valve and following the severing and separation of the pipe sections 114 and 115, the valve body 151 is screwed into position until the resilient seal 167 provided on the upper face 168 of the barrel portion 153 is under pressure. As shown by FIG. 13, the liner 121 provides a stop 197 engageable by the valve body shoulder 154 to gauge the insertion of the valve body 151. The valve is rotated to various settings by turning the handle 163, which is aligned with the head portion 161 of the T-shaped passage 160, either parallel with or transversely of the axis of the pipe 113. The direction of the arrow 164 indicates the flow condition.

While the outlet port plug is in position, either of the valve assembles 19 or 119 may be operated as a simple cut-off valve. When the outlet plug is replaced by a branch line fitting, however, the valves are provided with a diverting capability.

Figure 16:
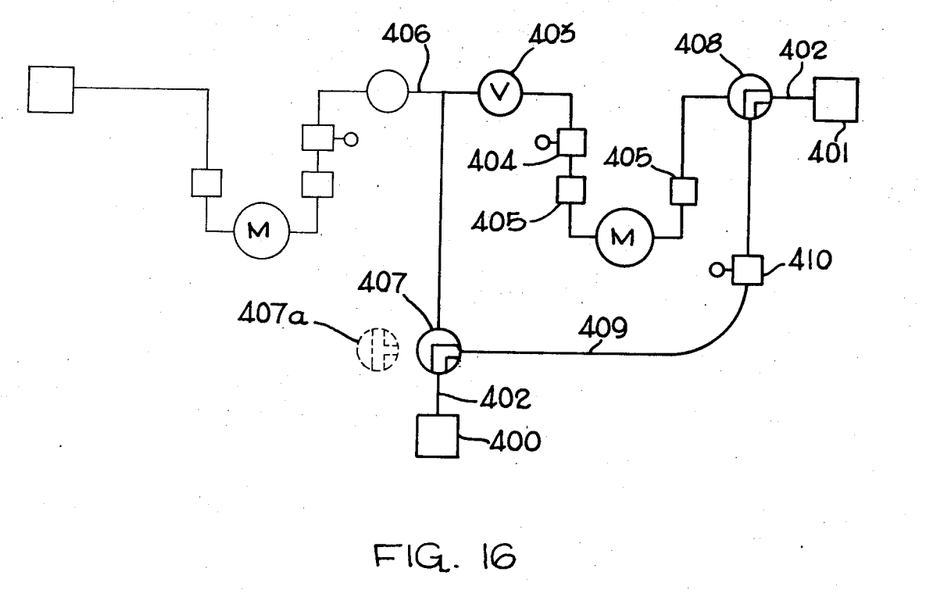
FIG. 16 is a schematic representation of the use of the pipe fittings to remove and replace a meter.

FIG. 16 is a schematic representation of the use of the pipe fittings to provide "routine" valves in a typical gas supply system in order to avoid cutting off the gas supply to the consumer during removal and replacement of the meter. The typical system includes a supply station 400 supplying a consumer station 401 through a supply line 402. The supply line 402 includes a cut-off valve 403, a regulator 404 and a pair of insulated swivels 405 flanking a meter M disposed between the supply station 400 and a consumer station 401. Without the use of pipe fittings herein described, the cut-off valve 403 would have to turned off in order to remove and replace the meter M, thereby cutting off the supply to the customer during this operation. When these pipe fittings are utilized, this is not the case.

The procedure is as follows: pipe fittings 406 and 407 incorporating, for example, push-pull valve assemblies 19, are reversely installed into the supply line 402 with each valve assembly 19 set in the open position so that flow through the valve is uninterrupted. The outlet or "routine" plugs 56 are removed from the fittings and replaced by a by-pass hose 408 which includes a regulator 409. The fittings 407 and 408 are then simultaneously set to the diverting "routine" position which will cut off gas supply through the meter M, divert flow from the supply station 400 to the by-pass hose 409 and from the by-pass hose 409 to the consumer station 401.

Pipe fittings of the type herein described can also be used to maintain gas supply to multiple consumer stations when the meter M of one consumer is to be removed and replaced. For example, in FIG. 16, numeral 406 indicates a supply to a second consumer. By installing a fitting 407a which has a capability of providing branch line diversion and direct upstream and downstream flow, e.g., valve assembly 119, the flow to line 406 is maintained. Shutting off existing valve 403 permits the removal and replacement of meter M.

It will be understood that the use of these pipe fittings is not limited to conditions where it is necessary to maintain flow. For example, the structural arrangement of parts is such as to lend itself to the manufacture of fittings of a small size. Thus, the fittings are useful in situations where accessibility is restricted whether or not it is convenient to interrupt flow.

I claim as my invention:

1. A pipe fitting comprising:
  a. a coupling including coupling portions adapted to be disposed in embracing relation about a pipe, the coupling including an outlet port.
  b. attachment means interconnecting said coupling portions together,
  c. cutter means carried by said coupling and adapted to engage and sever the pipe into sections when the coupling is rotated about the pipe,
  d. valve means carried by the coupling, the valve means including passage means communicating between the severed pipe sections in a first valve position and between one of said pipe sections and the outlet port in a second valve position.

2. A pipe fitting as defined in claim 1, in which:
  e. the passage means includes a first portion communicating between the pipe sections in the first valve position and a second portion transversely disposed of the first portion and communicating between said one pipe section and the outlet port in the second valve position.

3. A pipe fitting as defined in claim 1, in which:
  e. the valve means includes a body mounted to said coupling in non-rotatable relation, said body including:
    1. an outer case, and
    2. an inner piston slidably received by said outer case for movement between said first and second valve positions.

4. A pipe fitting as defined in claim 3, in which:
  f. spaced stop means between said outer case and said piston define said first and second valve positions.

5. A pipe fitting as defined in claim 7, in which:
  g. spaced stop means between said outer case and said piston define said first, second and third valve positions.

6. A pipe fitting as defined in claim 1, in which:
  e. said coupling includes a valve compartment defining a substantially rectangular valve opening, and
  f. the valve means includes a body of substantially rectangular cross section received by the opening and mounted in non-rotatable relation within said compartment, the body including:
    1. an outer case including means engaging said coupling to hold said case within said compartment to preclude withdrawal of said case therefrom, and
    2. an inner piston slidably received by said outer case for movement between said first and second valve positions.

7. A pipe fitting as defined in claim 4, in which:
  g. the outer case includes:
    1. opposed ports communicating with associated pipe sections, and
    2. a transverse port communicating with the outlet port, and
  h. the piston includes:
    1. a first port communicating between said opposed ports in the first valve position, and
    2. a second port communicating between one of said opposed ports and the transverse port in the second valve position.

8. A pipe fitting as defined in claim 5, in which:
  i. the piston includes closure means selectively closing at least one of said opposed ports to cut off flow through the valve in a third valve position.

9. A pipe fitting as defined in claim 1, in which:
  e. the valve means includes a rotatable cylindrical body threadedly mounted to said coupling for rotation between the first and second valve positions.

10. A pipe fitting as defined in claim 1, in which:
  e. said coupling includes a valve compartment defining a substantially circular valve opening, and
  f. the valve means includes a body of substantially circular cross section, the body including:
    1. an inner portion providing the passage means, and
    2. an outer portion threadedly received by the valve compartment.

11. A pipe fitting as defined in claim 10, in which:
  g. the passage means has a substantially T-shaped configuration including a stem communicating with the outlet port in the second valve position.

12. A pipe fitting as defined in claim 11, in which:
  h. indicator means on the outer portion of the valve body indicate the direction of flow through the passage means.

13. A pipe fitting comprising:
  a. a coupling including a pair of coupling halves adapted to be disposed in embracing relation about a pipe containing fluid under pressure and the coupling including an outlet port, one of said coupling halves including a non-circular valve compartment,
  b. attachment means interconnecting said coupling halves together,
  c. cutter means carried by the other of said coupling halves and adapted to engage and sever the pipe into sections when the coupling is rotated about the pipe,
  d. insulation means carried by said coupling halves to insulate the pipe from the coupling, e. sealing means carried by said coupling halves, and at least partially sealing the gap between the pipe sections, and
f. valve means carried by said one coupling half and including:
   1. an outer case disposed within the valve compartment in substantially fixed relation to its associated coupling half, and
   2. an inner piston received by the outer case in sliding relation thereto and movable between a first valve position, permitting fluid flow between the pipe sections, and a second valve position diverting fluid flow from one of said pipe sections to the outlet port.

14. A pipe fitting as defined in claim 13, in which:
g. the outer case includes:
   1. first and second opposed ports communicating with associated pipe sections, and
   2. a third port communicating with the outlet port, and
h. the piston includes:
   1. a first passage selectively alignable with the first and second opposed ports in the first valve position, and
   2. a second passage selectively alignable with one of said opposed ports and the outlet port in the second valve position.

15. A pipe fitting as defined in claim 14, in which:
i. spaced stop means between the outer case and piston define the first and second valve positions.

16. A pipe fitting as defined in claim 13, in which:
g. the piston includes closure means and is selectively movable to a third valve position whereby the closure means cuts off flow through the valve, and
h. spaced stop means between the outer case and the piston define the three valve positions, said stop means including:
   1. a recess disposed in the piston and having spaced end abutment portions and intermediate abutment portions, and
   2. a latch element attached to the outer case and movable relative to said recess, said element including opposed shoulders engaging associated end abutments, and movable portions selectively engaging said intermediate abutment portions.

17. A pipe fitting comprising:
a. a coupling including a pair of coupling halves adapted to be disposed in embracing relation about a pipe containing fluid under pressure and including an outlet port, one of said coupling halves including a substantially circular valve compartment having a threaded portion,
b. attachment means interconnecting said coupling halves together,
c. cutter means carried by the other of said coupling halves and adapted to engage and sever the pipe into sections when the coupling is rotated about the pipe,
d. insulation means carried by the coupling halves and engageable by said pipe to insulate said pipe from the coupling,
e. sealing means carried by the coupling halves and at least partially sealing the gap between the pipe sections, and
f. valve means carried by said one coupling half and including:
   1. an inner portion including passage means operatively disposed between the pipe sections, and
   2. a threaded outer portion threadedly received within the valve compartment for rotation of the inner portion between a first valve position permitting fluid flow between the pipe sections and a second valve position diverting fluid flow from one of said pipe sections to the outlet port.

18. A pipe fitting as defined in claim 17, in which:
g. the passage means is substantially T-shaped to include a head portion selectively communicating between the pipe sections and a stem portion selectively communicating between one of said pipe sections and the outlet port.

19. A pipe fitting as defined in claim 17, in which:
g. the inner portion includes an end face, and
h. resilient sealing means is operatively disposed between the end face and said other coupling half.

20. A method of severing and coupling a pipe comprising the steps of:
a. mounting a cutter interiorly of a coupling,
b. mounting the coupling to the pipe,
c. rotating the coupling to sever the pipe,
d. separating the severed portions of the pipe, and
e. clamping the coupling to the pipe.

21. A method of removing and replacing a meter or the like from a pipeline, while maintaining flow between upstream and downstream portions thereof, comprising the steps of:
a. mounting a first cutter interiorly of a first coupling,
b. mounting the first coupling to the pipe upstream of the meter,
c. rotating the first coupling to sever the pipe,
d. separating the severed portions of the pipe,
e. inserting a diverting valve between the separated pipe sections,
f. clamping the coupling to the pipe,
g. mounting a second cutter interiorly of a second coupling,
h. mounting the second coupling to the pipe downstream of the meter,
i. rotating the second coupling to sever the pipe,
j. separating the severed portions of the pipe,
k. inserting a diverting valve between the separated pipe sections,
l. clamping the second coupling to the pipe,
m. connecting a by-pass line between the couplings,
n. diverting flow from the upstream line through the bypass line to the downstream line,
o. cutting off flow through the meter,
p. removing the meter from the line,
q. replacing a meter in the line,
r. cutting off flow through the by-pass line, and
s. restoring flow through the meter.

22. A method of removing and replacing a meter or the like from a pipeline supplying a plurality of consumer stations, each station including an associated meter, while maintaining flow to the stations, the method comprising the steps of:
a. mounting a first cutter interiorly of a first coupling,
b. mounting the first coupling to the pipe upstream of the meters,
c. rotating the first coupling to sever the pipe,
d. separating the severed portions of the pipe, e. inserting a diverting valve between the separated pipe sections,
f. clamping the coupling to the pipe,
g. mounting a second cutter interiorally of a second coupling,
h. mounting the second coupling to the pipe downstream of the meter to be removed,
i. rotating the second coupling to sever the pipe,
j. separating the severed portions of the pipe,
k. inserting a diverting valve between the separated pipe sections,
l. clamping the second coupling to the pipe,
m. connecting a by-pass line between the couplings,
n. cutting off flow through the meter to be removed,
o. diverting flow from the upstream line through the by-pass line to the downstream line while maintaining flow to the meters,
p. removing the meter from the line,
q. replacing a meter in the line,
r. cutting off flow through the by-pass line, and
s. restoring flow through the meter.

* * * * *